US011700329B2

United States Patent
Matula et al.

(10) Patent No.: US 11,700,329 B2
(45) Date of Patent: Jul. 11, 2023

(54) MANAGED CHANNEL FOR AGENT-TO-AGENT CONSULTATION

(71) Applicant: Avaya Inc., Santa Clara, CA (US)

(72) Inventors: Valentine C. Matula, Granville, OH (US); Bharti Patwari Poorey, Pune (IN); Rajagiri Ravi, Pradesh (IN)

(73) Assignee: Avaya Inc., Santa Clara, CA (US)

( * ) Notice: Subject to any disclaimer, the term of this patent is extended or adjusted under 35 U.S.C. 154(b) by 104 days.

(21) Appl. No.: 16/370,462

(22) Filed: Mar. 29, 2019

(65) Prior Publication Data
US 2020/0314242 A1    Oct. 1, 2020

(51) Int. Cl.
| H04M 3/00 | (2006.01) |
| H04M 5/00 | (2006.01) |
| H04M 3/51 | (2006.01) |
| H04M 3/523 | (2006.01) |

(52) U.S. Cl.
CPC ....... *H04M 3/5183* (2013.01); *H04M 3/5141* (2013.01); *H04M 3/5235* (2013.01); *H04M 2203/404* (2013.01)

(58) Field of Classification Search
CPC ...... H04M 3/51; H04M 3/523; H04M 3/4234; H04M 3/5125; H04M 3/5175; H04M 3/5191; H04M 7/12; H04M 2203/2005; H04M 2203/2044; H04M 2203/609; H04M 3/02; H04M 3/5232; H04M 7/128; H04M 11/06; H04M 3/5235; H04M 3/527; H04L 51/04; H04L 5/14; H04L 65/1006; H04L 65/1096; H04Q 3/0045; H04Q 3/66; H04Q 11/0005; H04Q 1/136

USPC .... 379/265.09, 265.13, 202.01, 221.08, 240, 379/265.02, 265.03, 265.11; 370/254, 370/401, 218, 228, 236, 352, 355
See application file for complete search history.

(56) References Cited

U.S. PATENT DOCUMENTS

| 8,634,543 | B2 | 1/2014 | Flockhart | |
| 10,284,723 | B1 * | 5/2019 | Neuer, III | H04M 3/5183 |
| 10,616,345 | B1 * | 4/2020 | Ouimette | H04L 67/26 |
| 2001/0048678 | A1 * | 12/2001 | Witchalls | H04L 65/1069 370/352 |
| 2003/0117953 | A1 * | 6/2003 | Kinahan | H04W 28/26 370/229 |
| 2005/0105711 | A1 * | 5/2005 | Morris | H04M 3/5108 379/265.01 |
| 2008/0307220 | A1 * | 12/2008 | Campbell | G06Q 20/02 713/155 |
| 2010/0235218 | A1 | 9/2010 | Erhart et al. | |
| 2010/0296417 | A1 | 11/2010 | Steiner | |

(Continued)

*Primary Examiner* — Kharye Pope
(74) *Attorney, Agent, or Firm* — Sheridan Ross P.C.

(57) ABSTRACT

Communications between agents and customers are a key feature of contact centers. Agents may have a question about how to perform a particular task, a response to the question that other agents may know. A supervisor may be presently unavailable and transferring the customer requires significantly more overhead and resources. The systems and methods herein disclose an agent-to-agent (A-to-A) channel that enables a question to be posed to an agent and receive a response via a dedicated channel for A-to-A communications. Accordingly, the agent may stay engaged with the customer and resolve issues without the need to wait for a supervisor or transfer the customer to another agent.

20 Claims, 5 Drawing Sheets

(56) References Cited

U.S. PATENT DOCUMENTS

| | | | |
|---|---|---|---|
| 2011/0090899 A1* | 4/2011 | Fedorov | H04L 65/403 370/352 |
| 2011/0125793 A1 | 5/2011 | Erhart et al. | |
| 2011/0125826 A1 | 5/2011 | Erhart et al. | |
| 2011/0189985 A1* | 8/2011 | Gao | H04Q 3/0025 455/422.1 |
| 2011/0289220 A1* | 11/2011 | Henson | H04M 3/5116 709/227 |
| 2012/0099720 A1* | 4/2012 | Soundar | H04M 3/5158 379/265.02 |
| 2012/0173330 A1* | 7/2012 | Rodin | G06Q 40/00 705/14.49 |
| 2012/0224020 A1* | 9/2012 | Portman | H04M 3/5133 348/14.02 |
| 2013/0303133 A1* | 11/2013 | Sansalone | H04M 1/72519 455/414.1 |
| 2016/0210690 A1* | 7/2016 | Tisler | G06Q 30/08 |
| 2016/0349960 A1* | 12/2016 | Kumar | G06F 3/04817 |
| 2016/0360038 A1* | 12/2016 | Phelps | H04M 3/5166 |
| 2017/0085596 A1* | 3/2017 | Hopson, III | H04L 65/1053 |
| 2017/0111503 A1* | 4/2017 | McGann | H04M 3/5233 |
| 2018/0083830 A1* | 3/2018 | Pendleton | H04L 41/5096 |

* cited by examiner

MANAGED CHANNEL FOR AGENT-TO-AGENT CONSULTATION

CROSS-CITATION TO RELATED APPLICATIONS

The present application incorporates by reference U.S. application Ser. No. 16/370,535 filed Mar. 29, 2019 entitled "MANAGED CHANNEL FOR AGENT-TO-AGENT CONSULTATION", the entire disclosure of which is hereby incorporated by reference.

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communications between networked nodes and particularly to channel-specific communications for use by such nodes.

BACKGROUND

In a call center, the live agents use different means when they are in need of help while handling a contact (e.g., a customer utilizing a communication device). One of these means is to consult another agent. In a busy call center, where all the other agents are busy handling tasks, it may become difficult to find and connect to a free agent, using instant messaging (IM) or directly dialing, in order to get assistance.

Currently an agent who requires information may:

a. Look in knowledge bases or ask an automated search "bot.": Such systems may not provide complete answers and generally are significantly time consuming. This is particularly problematic if the agent currently has a real-time communication ongoing with the customer.

b. Check with supervisor: The supervisor may be busy or otherwise unavailable.

c. "Ping" another agent who may know the answer, such as by utilizing presence information and directly messaging the agent (similar to a unified communication (UC) telephone call in routing): However, the agent may not be aware of the best person to contact or, if known, the other may not be free to answer this query.

d. Have a consultation—transfer/conference: Here to, the agent must know who to contact and the other agent must be available.

Being able to query another agent to address a minor issue, allows knowledge of the solution to be obtained by the original agent and allow the agent to proceed with the work item to resolution without the overhead associated with transferring the customer communication to another agent. However, even with such solutions available, problems remain.

SUMMARY

These and other needs are addressed by the various embodiments and configurations of the present invention. The present invention can provide a number of advantages depending on the particular configuration. These and other advantages will be apparent from the disclosure of the invention(s) contained herein.

In one embodiment, a new strategy for agent-agent consultation is provided which may leverage the use and benefits of current multi-channel platforms. And, new additional sub-feature of escalating chat-to-voice within contact center consultations for communications between agent and/or agent with customer.

Current systems, such as Avaya Multiplicity (e.g., as supported by Avaya Interaction Center and Avaya Oceana™/Workspaces), allow contact center live agents to handle multiple contacts concurrently. For example, one or more agents may have their agent communication device configured for multiplicity capability, such as 1 voice call, 2 emails and 3 chats.

In a busy call center, the agents may be occupied-in (utilizing) all the multiplicity options allotted to them. The time between interactions (e.g., ending one call and being connected to another, closing one chat session and being presented with another, closing a chat and being presented with an email, etc.) may be minimal or non-existent. There may not be any agents available to assist an agent who is in need of a quick help to take the interaction forward.

Accordingly, and in one embodiment, a new channel type is defined in the contact center which, herein, will be identified as "agent-to-agent assist" channel. This channel is agent facing and segregated from the customer facing channels. For example, the multiplicity factors of a particular agent may look like: 1 maximum concurrent voice, 2 emails, 2 customer-facing chats and 1 agent-to-agent assist channels. Accordingly, there is one agent-to-agent assist channel available for other agents to utilize to seek, and/or provide, assistance.

An agent in need of quick assistance will frame the query and raise it to a routing engine. Agent can use different means to create the query such as speech, text, speech to text, video, etc. and then be routed and connected utilizing the mode (e.g., text, voice, video, etc.) selected for the query.

Components, such as the routing engine, will identify the best matching agent and post the query to them.

Agents, who receive queries from other agents and provide assistance thereto, may be evaluated similarly to how they would if the "customer" was an actual, external customer rather than an agent of the contact center. Inputs into assessing top agent can be any or all of the current available technology: Skills-based routing, Avaya Conversational Intelligence+"Progress analytics" module, agent self-assessment, customer input via separate co-browsing/digital interface, etc.

A benefit of utilizing the agent-to-agent assist channel allows queries to be routed utilizing similar equipment and methodologies utilized for other channels of the contact center. Accordingly, the contact center may utilize new or existing systems to track, further permit transfers, and even escalate, such as from text to voice, or facilitate "melding" of the customer to the new agent via agent-agent transfer.

In another embodiment, if an agent utilizing text chat in an agent-to-agent assist determines that the caller would be well-served, or at least better served, by the new agent, the interaction with the customer can be held with the original agent until the new agent becomes free from their current call, or can even queue the transfer to the new agent for connection when the prior call completes.

In other embodiments, the contact center can have configuration to provide:

Higher priority for agent-to-agent assist channel so agents can provide quick assist in busy hours.

Control the number of agent-to-agent assist queries for a particular agent for a given time period (e.g., hour, work shift, etc.)

In another embodiment, analysis of assist queries may be utilized:

to determine agents skill levels;

in knowledge sharing, such as building/updating knowledge bases, bots and content utilized to train new agents;

implementing assistance satisfaction ratings;

supervisors may choose to publish these quick assist data to customer forums, documentations, or guides.

If a contact center's policy is to require agents to query for help using formal channel, statistics on quantity and type of skill being requested can be generated for individuals, teams, and campaigns. This can formally drive training and identification of new topics to be added to knowledge bases.

A benefit of this approach is the reduction in the cost of consultations, increasing the formality and trackability of consultations, and permitting a more structured way to transfer to skilled agent for assistance if needed.

In one embodiment, a system for communications on a network is disclosed, comprising: a managed agent communication device for communicating with nodes on the network: a microprocessor; a memory; a network interface facilitating communications via the network; wherein the microprocessor is configured to engage in communications, utilizing a fixed number of communication channels, via the network; wherein, a first portion of the fixed number of communication channels comprise are allocated for communications with nodes known to be associated with customer communication devices; and wherein, a second portion of the fixed number of communication channels comprise are allocated for communications with nodes known to be associated with agent communication devices.

In another embodiment, a communication device is disclosed, comprising: a microprocessor; a memory; a network interface facilitating communications via a network; wherein the microprocessor is configured to engage in communications, utilizing a fixed number of communication channels, via the network; wherein, a first portion of the fixed number of communication channels are allocated for communications with nodes known to be associated with customer communication devices; and wherein, a second portion of the fixed number of communication channels are allocated for communications with nodes known to be associated with agent communication devices.

In another embodiment, a method is disclosed, comprising: receiving a request for a communication from a node on a network at a device configured to engage in communications, via the network, utilizing a fixed number of communication channels; allocating a first portion of the fixed number of communication channels for communications with nodes known to be associated with customer communication devices; and allocating a second portion of the fixed number of communication channels for communications with nodes known to be associated with agent communication devices; and wherein each of the fixed number of communication channels is a member of only one of either the first portion of the fixed number of communication channels or the second portion of the fixed number of communication channels.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
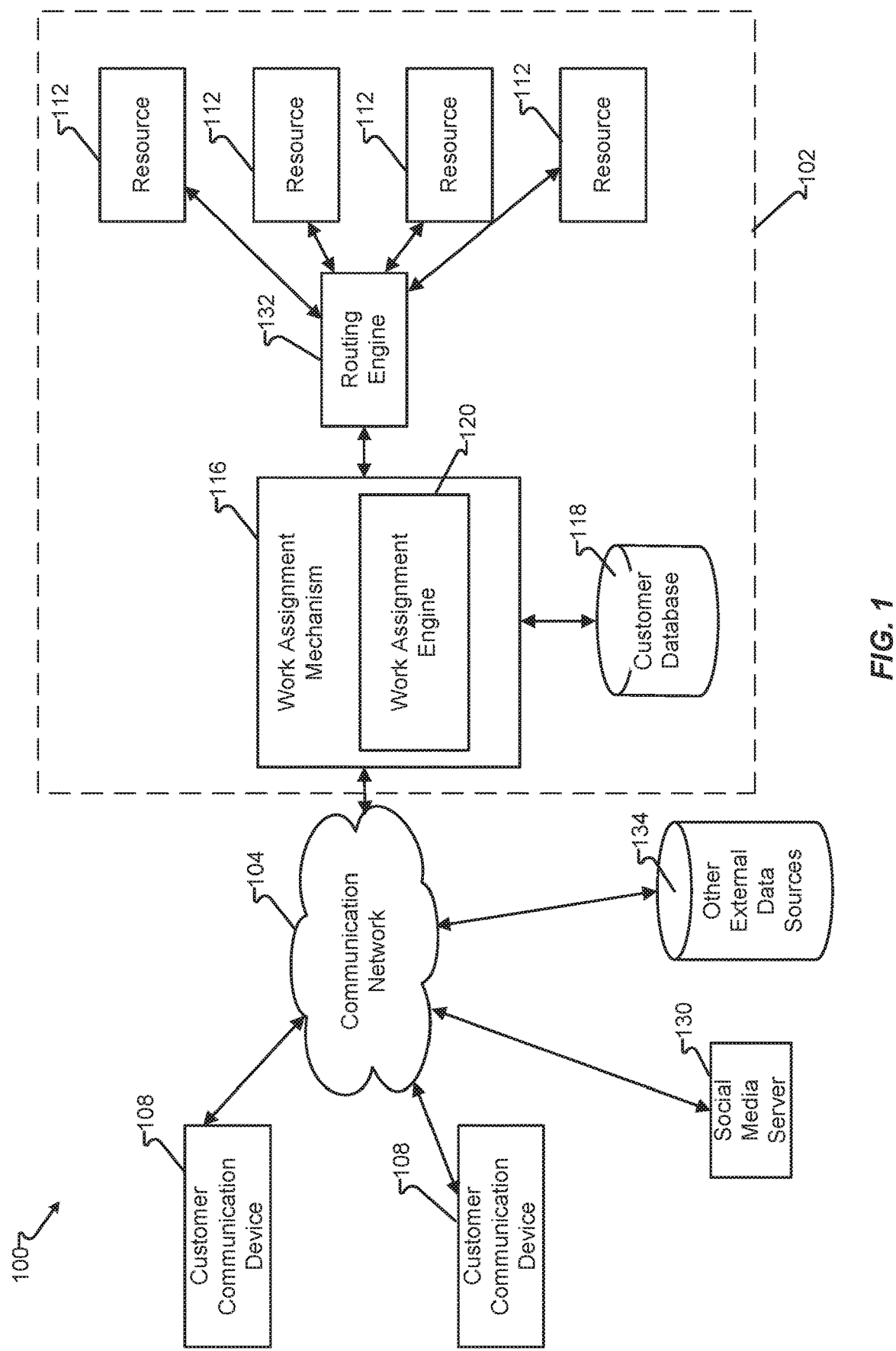
FIG. 1 depicts a system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media website 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
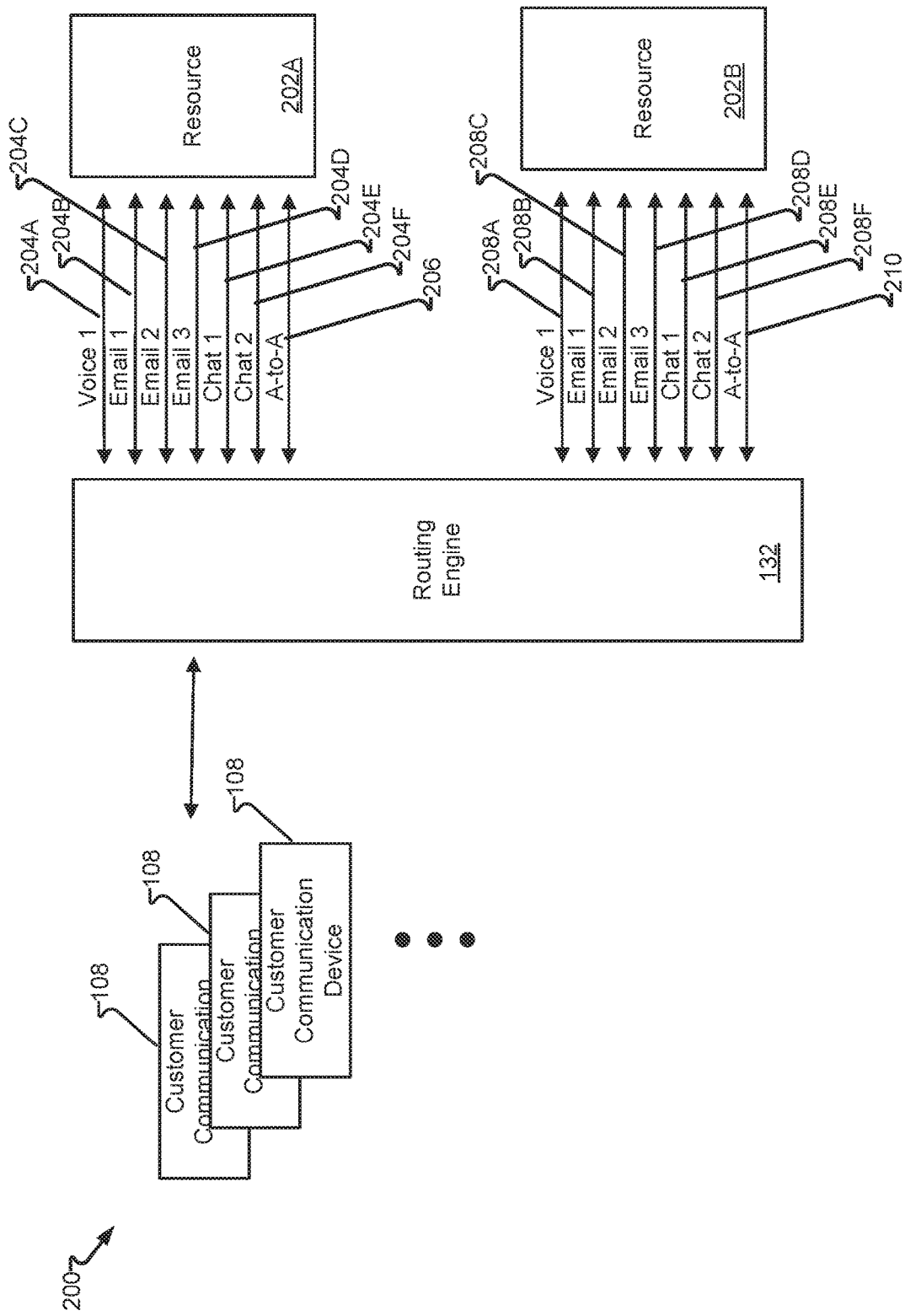
FIG. 2 depicts portions of a system in accordance with embodiments of the present disclosure.

FIG. 2 depicts portions 200 of a system in accordance with embodiments of the present disclosure. In one embodiment, portions 200 are portions of system 100. For clarity and to avoid unnecessarily complicating the figures, components that may be utilized in portions 200 are omitted (e.g., edge devices, network switches, etc.). In one embodiment, a number of customer communication devices 108 are connected to a number of resources 202. Resources 202 are each an embodiment of resource 112 when embodied as a human agent utilizing an agent communication device enabled to support two or more communication channels. For example, each of resource 202A and resource 202B are illustrated as each having one voice, three email, two chat, and one agent-to-agent ("A-to-A") channel enabled, such as by a configuration of their respective agent communication device and/or a configuration of a different component of portion 200 managing the channels, such as routing engine 132. While resources 202A and 202B are illustrated as having the same connectivity enabled, in other embodiments other connectivity's are enabled/disabled. For example, one resource 202 may only be enabled for a single voice channel and no other customer-interaction channels, another resource 202 may be enabled for eight text chat channels and one email channel and no voice channels, etc. It should also be appreciated that the configuration of channels 204, 208 may be dynamic. For example, an agent comprising a portion of resource 202A may be engaged with a customer via voice channel 204A. If the content of the voice channel requires a significant amount of idle time, such as the customer is known to need several minutes to perform a particular operation, resource 202A may be dynamically reconfigured to add another voice channel, such as with a different customer utilizing a different customer communication device 108, such as with a customer whose associated work item is anticipated to be completed during the time period in which the first customer is performing their operation. This may cause the number of non-voice channels (e.g., email channel 204B, 204C, 204D, chat 204E, 204F) to be maintained or temporarily reduced.

However, each resource 202 consists of utilization of one A-to-A channel, such as A-to-A channel 206 for resource 202A and A-to-A channel 210 for resource 202B. In another embodiment, at least one resource 202 comprises more than one A-to-A channel. Having a plurality of A-to-A channels, while enabled by certain embodiments herein, is unlikely as the intended usage is to allow agents to have a quick conversation with another agent while the customer remains engaged and without transferring the customer. However, other usages of the A-to-A channel may warrant implementations of more than one such channel.

Routing engine 132 receives channel requests from each of the plurality of customer communication devices 108. In another embodiment, routing engine 132 may initiate one or more communication requests with customer communication devices 108 (e.g., for an outbound campaign). Customers, via their respective customer communication device 108, is then connected to one of resources 202 via a communication channel 204 or 208, such as voice channel 204A; email channel 204B, 204C, 204D; text chat channel 204E, 204F, for resource 202A or voice channel 208A; email channel 208B, 208C, 208D; text chat channel 208E, 208F, for resource 202B. Customers are more generally sensitive to delays and idle progress with real-time communications (e.g., voice communications). Accordingly, the embodiments herein are primarily directed to examples wherein an agent is engaged in a voice communication and requires the assistance of another agent, which requires the customer to wait, such as via being placed on hold. However, it should be appreciated that such embodiments may be utilized for agents engaged in other forms of communications with a customer without departing from the scope of the embodiments herein.

In one embodiment, resource 202A may request an A-to-A channel of a specific agent or a agents having a specific agent attribute (e.g., member of the international reservations team, expert in "product A," native Portuguese speaker, senior technical expert, etc.). In one embodiment, such as when a request is made to a specific agent, for example, resource 202B the request is denied if A-to-A channel 210 is currently in use. In another embodiment, routing engine 132 responds to resource 202A with a notification that the request failed, which may further comprise notification that the selected resource is currently not available to accept the A-to-A communication.

In another embodiment, routing engine 132 may managing the A-to-A channels in the same manner and utilizing the same algorithms, with different input variables, as those utilized for customer-agent communications. For example, customers, with their respective customer communication device 108 may enter contact center 102 via an automated resource 112, such as an interactive voice response unit or other analysis engine. For example, a customer may select an option to talk to a billing representative or tell an automated resource 112 that, "I have a question about my bill." Accordingly, routing engine 132, alone or in concert with another component (e.g., work assignment mechanism 116, customer database 118, etc.) may determine that the call should be routed to a particular set or group of agents. The call is then enqueued to one or more agents.

In another embodiment, a denied request may be automatically forwarded to another agent. However, automatic forwarding may be disabled for a particular request, for a particular requesting agent, subject matter, etc. In other embodiments, a denied request may be enqueued for processing later. As the motivation for the use of A-to-A channels are typically time-sensitive, the wait time in queue may be reported back to the requestor or automatically dequeued if the wait time is above a threshold, which may be zero (e.g., the requested agent is currently able to accept the A-to-A channel usage request) to a few seconds. For example, an agent wishing to ask a quick question of a peer (e.g., "I can't remember how to select . . . . Where is that?") may have a default tolerance to wait, such as fifteen seconds, or select an option (e.g., "now or never") that requires the request to be honored immediately (e.g., within a few seconds) or the request is withdrawn and manually or automatically forwarded to another agent having the same or similar attribute.

In another embodiment, routing engine 132 and/or work assignment mechanism 116, work assignment engine 120, or a combination thereof, receives queries from customer communication devices 108 and resource 202A in substantially identical means. For example, a text message from a customer (e.g., "I have a question about my bill") may be parsed and an agent selected who can address billing questions. Similarly, a text message from one agent (e.g., "How do I get back to the screen to select a different . . . ?") may be parsed and an agent selected who can address screen-flow issues. In a further embodiment, to avoid routing customers via the A-to-A channels and agents to customer-facing communications channels, the source of the message may be considered. For example, resource 202A may have a known or membership in a group (e.g., subnet) of network addresses or that are associated with an internal network address, utilize a port on a switch or other network hardware known to be associated with internal devices, not utilizing a port or address utilized by customer communication devices 108, etc. Accordingly, a question such as, "How do I . . . " may be routed to a first portion of customer-facing communication channels (e.g., voice channels 204A, 208A; email channels 204B, 204C 204D, 208B, 208C, 208D; text chat channels 204E, 204F, 208E, 208F) when the originating device is known to be a customer communication device 108 or, additionally or alternatively, not known to be originating from a resource 202. Conversely, the same question may be routed to a selected resource 202 via an A-to-A channel (e.g., A-to-A channel 206, 210) when the originating device is known to be one of resource 202 or, additionally or alternatively, not known to be originating from a customer communication device 108. For example, if it is known that all agents (e.g., resources 202) use a particular range of IP addresses, MAC addresses, user identifier, machine name, physical location, etc., then questions may be solely allocated to the A-to-A channels (e.g., A-to-A channels 206, 210).

Figure 3:
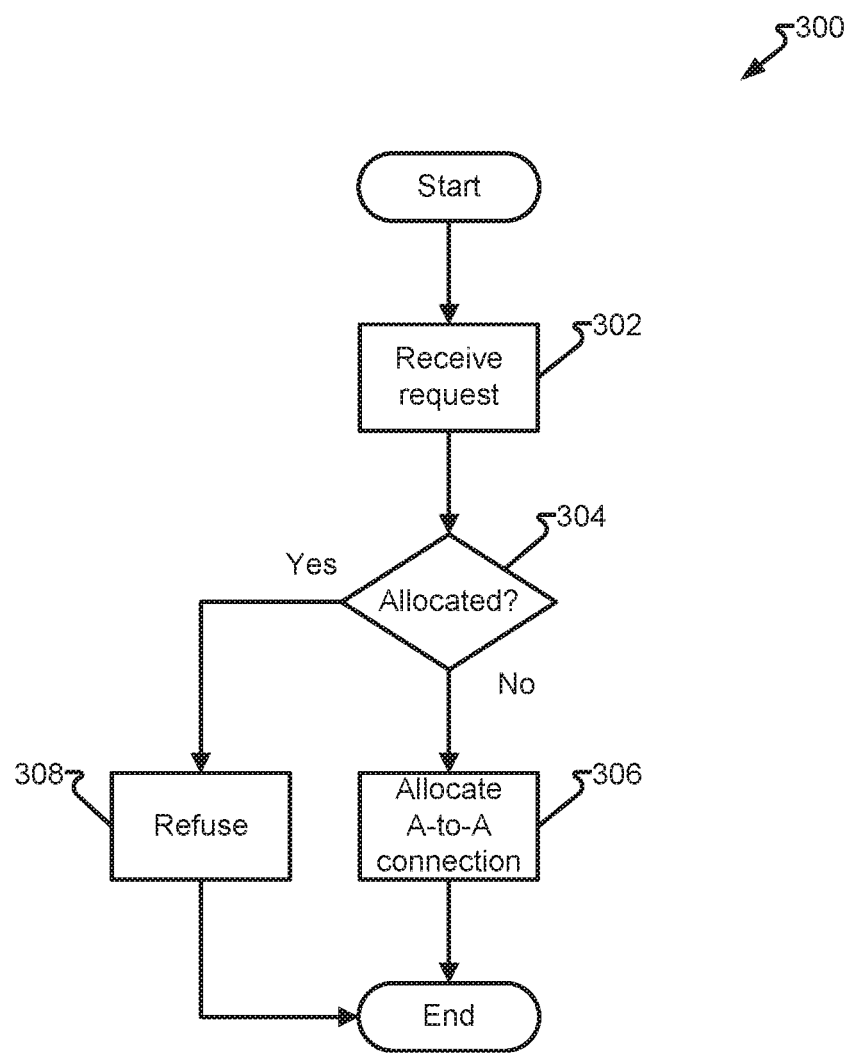
FIG. 3 depicts a process in accordance with embodiments of the present disclosure.

FIG. 3 depicts a process in accordance with embodiments of the present disclosure. In one embodiment, process 300 may be executed by a processor (e.g., processor 404 of FIG. 4) executing a dedicated processor or a shared process, such as a portion of work assignment engine 120, work assignment mechanism 116, routine engine 132, resource 202 comprising an agent communication device portion of a resource 112 utilizing the agent communication device as an interface with a human agent and/or other processing task.

Process 300 begins and step 302 receives a request for an A-to-A channel. The request originates from a requesting agent, such as resource 202A, may be directed to a specific agent, such as resource 202B, (e.g., Agent Smith); a specific group, such as a plurality of resources 202B, (e.g., international airline reservations), a specific agent skill or agent attribute (e.g., language, product knowledge, etc.), authority (e.g., approval for a large transaction), other grouping or category of agent; or general (e.g., an available agent). Test 304 determines if the target agent is currently allocated on an existing A-to-A channel. If the target agent is one specific agent, and test 304 is determined in the affirmative, then step 308 refuses the connection. In another embodiment, the requesting agent may be notified and either resolve the issue on their own or be enqueued and connected with the requested agent when available. If the requested agent is a group, then another agent may be selected or, if none are available, the requesting agent notified or enqueued for the next available agent having the same or similar attribute.

If test 304 is determined in the negative, then step 306 is executed whereby the A-to-A channel for the requested agent is allocated and connected to the requesting agent for communications thereon.

Figure 4:
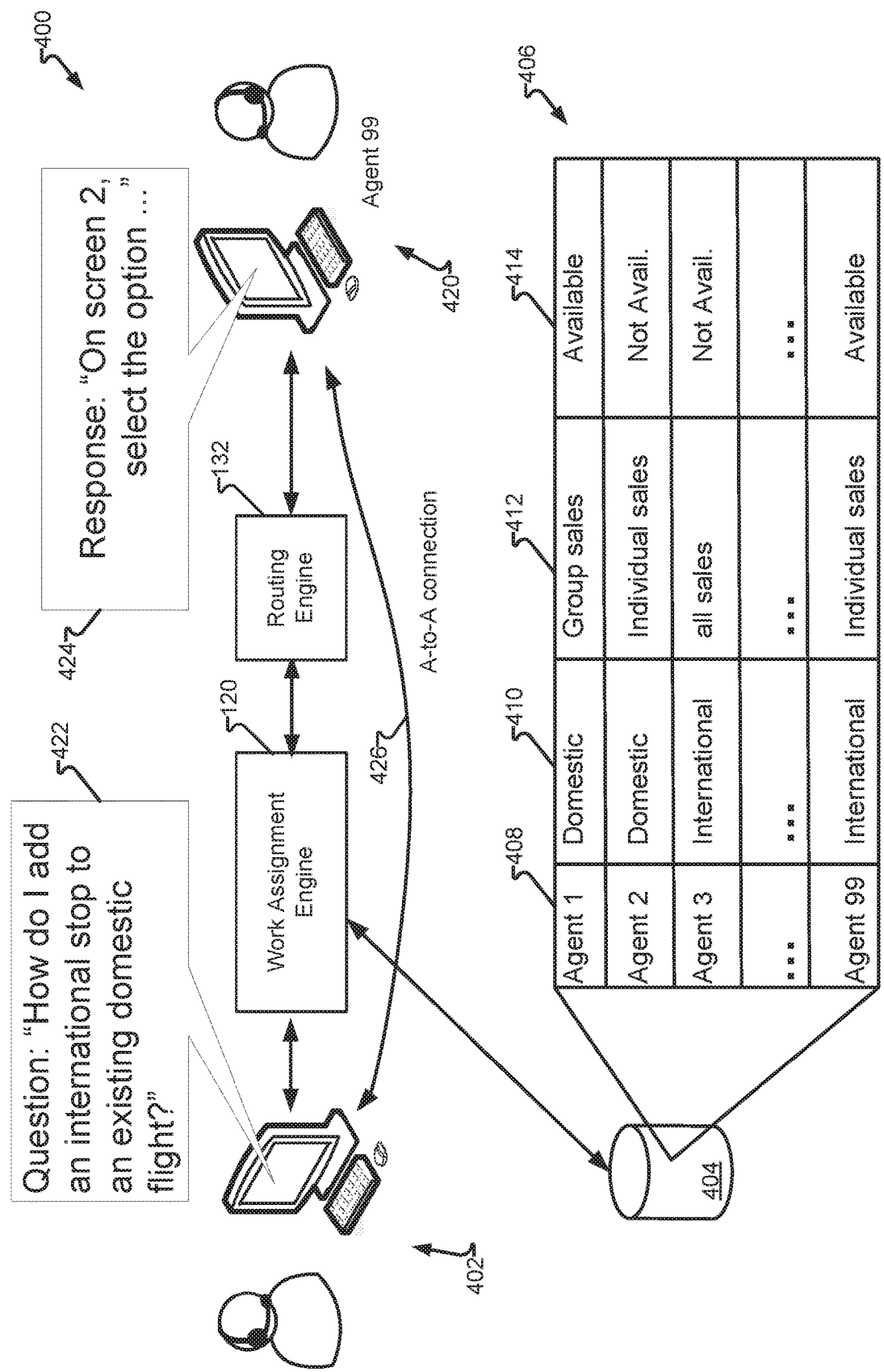
FIG. 4 depicts an interaction in accordance with embodiments of the present disclosure.

FIG. 4 depicts interaction 400 in accordance with embodiments of the present disclosure. In one embodiment, resource 402 is embodied as a resource 112 comprising a human agent utilizing an agent communication device to communicate with other resources 112 comprised of agents and their respective agent communication device, and customers, via their respective customer communication device 108. Resource 402 may have a question and seek resolution via an A-to-A channel with another agent. In one embodiment, resource 402 may request a specific responding agent and, if their respective A-to-A channel is available, the question may be presented for their response. However, if the requesting agent (e.g., resource 402) does not know who to ask or who is available to respond, interaction 400 provides one means by which an agent may be selected to provide the response.

Question 422, which may be text, may be provided to a processor of a component, such as work assignment engine 120. Similar algorithms may be utilized by work assignment mechanism 120 and/or routing engine 132 as those used to route calls from customer communication devices 108. For example, resource 402 has a question on adding an international stop to a customer's flight itinerary. Work assignment engine 120 may access table 406 with a memory or database 404. In one embodiment table 406 comprises a plurality of records, such as one for each agent identifier 408 and information related to the identified agents, such as department or group 410, skill attributes 412, current availability 414, and/or other attribute that may be utilized as a matter of design choice. The selected agent then connected and question 422 is provided thereto, such as via routing engine 132.

Question 422 may be parsed to identify keywords, phrases, or synonyms matching attributes 410 from those agents having availability indicated in current availability 414. A best match is then obtained and question 422 forwarded to the selected agent via the established A-to-A channel 426. To avoid unnecessarily complicating the figure, components utilized in enabling the connection between resource 402 and resource 420 are omitted and discussed in detail elsewhere herein. Resource 420 then provides response 424, via the A-to-A channel 426. Additionally or alternatively, record 406 may be updated with a change in availability 414 associated with the selected agent to avoid re-selecting the same agent for another A-to-A channel exchange while the current exchange utilizing A-to-A channel 426 is ongoing.

The interaction between resource 402 and resource 420 may be a simple, question-answer, interaction or a more complex, back-and-forth interaction. Additionally, or alternatively, A-to-A interaction 426 may begin with one type of communication, most commonly but not exclusively, text. However, A-to-A interaction 426 may change communication types, such as to incorporate or transition to other communication type(s) (e.g., voice, co-browsing, etc.) within the same A-to-A interaction 426.

In another embodiment, availability 414 may be determined solely on whether the associated agent is, or is not, presently engaged on an A-to-A channel. In another embodiment, other tasks may determine, in whole or in part, whether an agent is or is not available. For example, an agent engaged to two voice communications with different customers, such as when one customer can be placed on hold while a task is performed and, during that hold time, another customer voice call is initiated. Such an agent may be considered unavailable for A-to-A communications, even though they are not presently engaged in such a communication. Other attributes, such as being engaged in a high priority task, just beginning or about to end their work shift, assignment to a new task or area of responsibility, etc. may cause an agent to be unavailable to accept an A-to-A communication for a period of time.

Figure 5:
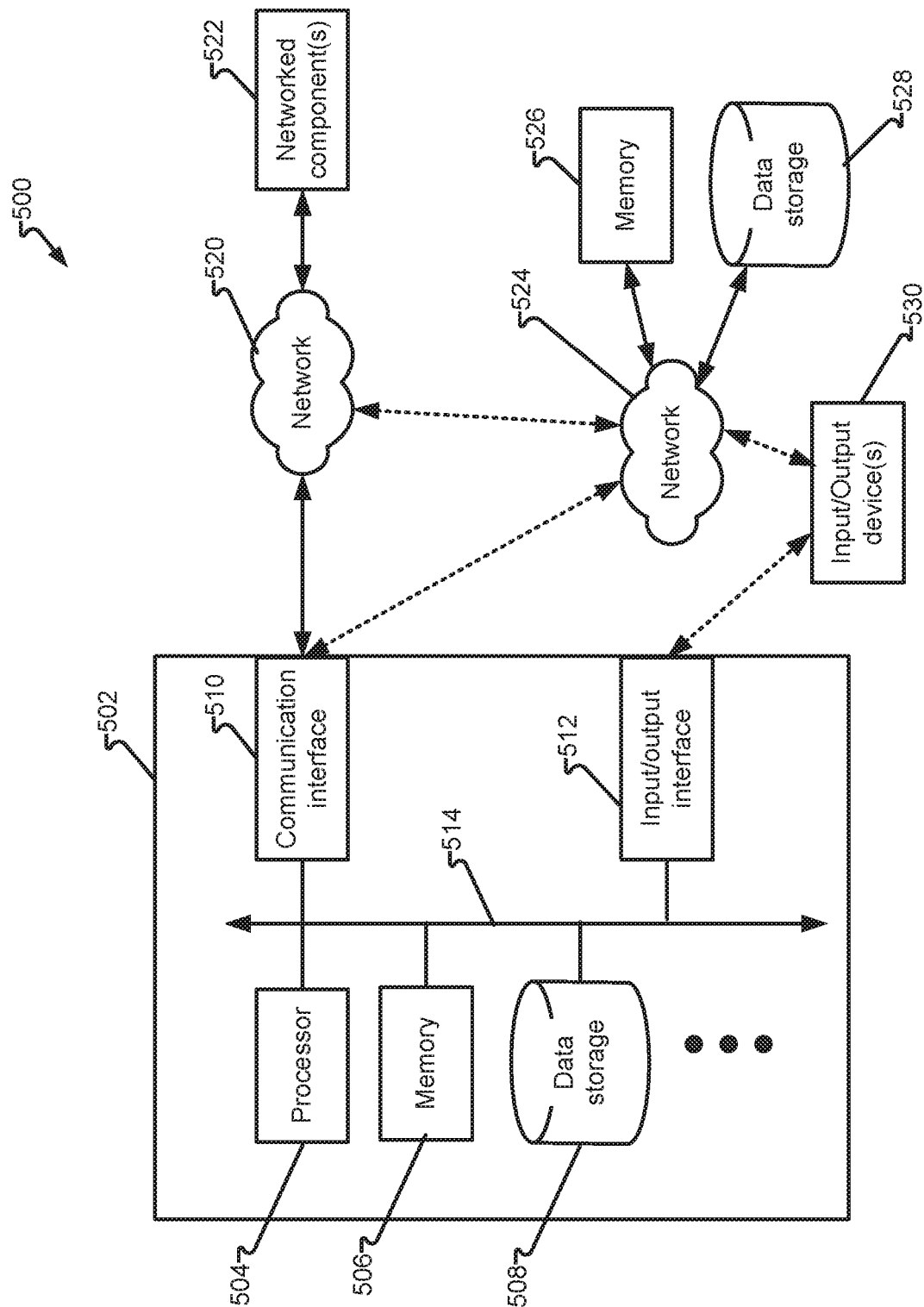
FIG. 5 depicts a component in accordance with embodiments of the present disclosure.

FIG. 5 depicts device 502 in system 500 in accordance with embodiments of the present disclosure. In one embodiment, one or more of routing engine 132, work assignment mechanism 116, work assignment engine 120, agent communication device of resource 112, or a combination thereof may be embodied, in whole or in part, as device 502 comprising various components and connections to other components and/or systems. The components are variously embodied and may comprise processor 504. Processor 504 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 514, executes instructions, and outputs data, again such as via bus 514.

In addition to the components of processor 504, device 502 may utilize memory 506 and/or data storage 506 for the storage of accessible data, such as instructions, values, etc. Communication interface 510 facilitates communication with components, such as processor 504 via bus 514 with components not accessible via bus 514. Additionally or alternatively, input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, etc. In another embodiment, communication interface 510 may comprise, or be comprised by, input/output interface 512. Communication interface 510 may be configured to communicate directly with a networked component or utilize one or more networks, such as network 520 and/or network 524.

Network 104 may be embodied, in whole or in part, as network 520. Network 520 may be a wired network (e.g., Ethernet), wireless (e.g., WiFi, Bluetooth, cellular, etc.) network, or combination thereof and enable device 502 to communicate with network component(s) 522.

Additionally or alternatively, one or more other networks may be utilized. For example, network 520 may represent a second network, which may facilitate communication with components utilized by device 502. For example, network 524 may be an internal network to contact center 102 whereby components are trusted (or at least more so) that networked components 522, which may be connected to network 520 comprising a public network (e.g., Internet) that may not be as trusted. Components attached to network 524 may include memory 526, data storage 528, input/output device(s) 530, and/or other components that may be accessible to processor 504. For example, memory 526 and/or data storage 528 may supplement or supplant memory 506 and/or data storage 508 entirely or for a particular task or purpose. For example, memory 526 and/or data storage 528 may be an external data repository (e.g., server farm, array, "cloud," etc.) and allow device 502, and/or other devices, to access data thereon. Similarly, input/output device(s) 530 may be accessed by processor 504 via input/output interface 512 and/or via communication interface 510 either directly, via network 524, via network 520 alone (not shown), or via networks 520 and 524.

It should be appreciated that computer readable data may be sent, received, stored, processed, and presented by a variety of components. It should also be appreciated that components illustrated may control other components, whether illustrated herein or otherwise. For example, one input/output device 530 may be a router, switch, port, or other communication component such that a particular output of processor 504 enables (or disables) input/output device 530, which may be associated with network 520 and/or network 524, to allow (or disallow) communications between two or more nodes on network 520 and/or network 524. For example, a connection between one particular customer, using a particular customer communication device 108, may be enabled (or disabled) with a particular resource 512. Similarly, one particular resource 112 may be enabled (or disabled) from communicating with a particular other resource 112. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system for managing communications on a network, comprising:
   a plurality of managed agent communication devices, each of the plurality of managed agent communication devices configured as nodes on the network;
   a microprocessor;
   a memory;
   a network interface facilitating communications via the network;
   wherein the microprocessor is configured to engage in communications, utilizing a fixed number of communication channels, via the network;
   wherein, a first portion of the fixed number of communication channels is allocated for communications with customer communication devices via a first portion of the network further comprising at least a portion of the network external to the system; and
   wherein, a second portion of the fixed number of communication channels is allocated for communications between two or more of the plurality of managed agent communication devices via a second portion of the network not comprising the at least a portion of the network external to the system.

2. The system of claim 1, wherein each of the fixed number of communication channels is a member of only one of either the first portion of the fixed number of communication channels or the second portion of the fixed number of communication channels.

3. The system of claim 1, wherein the microprocessor, upon receiving a communication request from one of the customer communication devices, determines if the first portion is currently engaged and, if true, refuses the communication request and, if false, accepts the communication request as one of the first portion of the fixed number of communication channels.

4. The system of claim 1, wherein the microprocessor, upon receiving a communication request from one of the plurality of managed agent communication devices, determines if each of the second portion of the fixed number of communication channels is currently engaged and, if true, refuses the communication request and, if false, accepts an associated communication as one of the second portion of the fixed number of communication channels.

5. The system of claim 1, further comprising:
   a routing engine;
   receiving, at the routing engine, a communication request for one of the plurality of managed agent communication devices from a requesting node of the nodes;
   wherein the routing engine, upon determining that the requesting node is one of the customer communication devices, determines if each of the first portion of the fixed number of communication channels is currently engaged and, if true, refuses the communication request and, if false, accepts the communication request and allocates one of the first portion of the fixed number of communication channels to an associated communication; and
   wherein the routing engine, upon determining the requesting node is one of the plurality of managed agent communication devices, determines if each of the second portion of the fixed number of communication channels is currently engaged and, if true, refuses the communication request and, if false, accepts the communication request and allocates one of the second portion of the fixed number of communication channels to the associated communication.

6. The system of claim 5, wherein the routing engine determines that a communication request is from one of the customer communication devices upon determining the communication request utilizes a communication port of the routing engine associated with customer communication devices.

7. The system of claim 5, wherein the routing engine determines that a communication request is from one of the customer communication devices upon determining the communication request utilizes a communication port of the routing engine not associated with any of the plurality of managed agent communication devices.

8. The system of claim 5, wherein the routing engine determines that the communication request is from one of the customer communication devices upon determining the communication request is associated with an origination address that is one of, associated with a customer communication device, associated with a pool of customer communication devices, or not associated with an address of one of the plurality of managed agent communication devices.

9. The system of claim 5, wherein refusing the communication request by the routing engine comprises enqueuing the associated communication in a work queue associated with the one of the plurality of managed agent communication devices.

10. The system of claim 1, wherein presence information is generated and made available to the agent communication devices, wherein presence information comprises a state of availability of the second portion of the fixed number of communication channels.

11. A communication device, comprising:
    a microprocessor;
    a memory;
    a network interface facilitating communications via a network;
    wherein the microprocessor is configured to engage in communications, utilizing a fixed number of communication channels, via the network;
    wherein, a first portion of the fixed number of communication channels is allocated for communications with customer communication devices via a first portion of the network further comprising at least a portion of the network external to a system comprising trusted components including the customer communication devices; and wherein, a second portion of the fixed number of communication channels are allocated for communications between two or more of a plurality of agent communication devices via a second portion of the network not comprising the at least a portion of the network external to the system.

12. The communication device of claim 11, wherein the first portion of the fixed number of communication channels comprise at least two of the fixed number of communication channels.

13. The communication device of claim 11, wherein the second portion of the fixed number of communication channels consists of one of the fixed number of communication channels.

14. The communication device of claim 11, wherein the microprocessor, upon receiving a communication request from one of the customer communication devices, determines if the first portion is currently engaged and, if true, refuses the communication request and, if false, accepts an associated communication as one of the first portion of the fixed number of communication channels.

15. The communication device of claim 11, wherein the microprocessor, upon receiving a communication request from one of the plurality of agent communication devices, determines if each of the second portion is currently engaged and, if true, refuses the communication request and, if false, accepts an associated communication as one of the second portion of the fixed number of communication channels.

16. The communication device of claim 15, further comprising:

presenting a notification of the communication request to a user;

receiving an input indicating one of acceptance or denial of the communication request; and wherein accepting the communication request further comprises accepting a communication channel upon receiving the input indicating acceptance; and wherein denying the communication request further comprises refusing the communication channel upon receiving the input indicating denial.

17. The communication device of claim 16, further comprising, upon determining that each of the second portion of the fixed number of communication channels is currently being utilized, omitting presenting the notification.

18. A method, comprising:

receiving a request for a communication from a node on a network at a device configured to engage in communications, via the network, utilizing a fixed number of communication channels;

allocating a first portion of the fixed number of communication channels for communications with customer communication devices via a first portion of the network further comprising at least a portion of the network external to a system comprising trusted components including a customer communication device;

allocating a second portion of the fixed number of communication channels for communications between two or more of a plurality of agent communication devices via a second portion of the network not comprising the at least the portion of the network external to the system; and wherein each of the fixed number of communication channels is a member of only one of either the first portion of the fixed number of communication channels or the second portion of the fixed number of communication channels.

19. The method of claim 18, further comprising determining that a communication request is from one of the customer communication devices upon determining the communication request utilizes a communication port of a routing engine associated with customer communication devices.

20. The method of claim 18, further comprising determining that a communication request is from one of the customer communication devices upon determining the communication request utilizes a communication port of a routing engine not associated with any of the plurality of agent communication devices.

* * * * *